United States Patent
Xiao et al.

(10) Patent No.: US 10,216,057 B2
(45) Date of Patent: Feb. 26, 2019

(54) ARRAY SUBSTRATE AND MANUFACTURING METHOD THEREOF, DISPLAY PANEL AND DISPLAY DEVICE

(71) Applicant: BOE TECHNOLOGY GROUP CO., LTD., Beijing (CN)

(72) Inventors: Li Xiao, Beijing (CN); Hui Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/540,132

(22) PCT Filed: May 17, 2016

(86) PCT No.: PCT/CN2016/082371
§ 371 (c)(1),
(2) Date: Jun. 27, 2017

(87) PCT Pub. No.: WO2017/166392
PCT Pub. Date: Oct. 5, 2017

(65) Prior Publication Data
US 2018/0136528 A1    May 17, 2018

(30) Foreign Application Priority Data
Mar. 29, 2016  (CN) .......................... 2016 1 0190726

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1343* (2013.01); *G02F 1/133345* (2013.01); *G02F 1/133512* (2013.01); *G02F 2201/40* (2013.01)

(58) Field of Classification Search
CPC ......... G02F 1/136286; G02F 1/133512; G02F 1/1362; G02F 1/1343; G02F 1/1333; G02F 1/1335; G02F 1/133345
See application file for complete search history.

(56) References Cited

U.S. PATENT DOCUMENTS

2011/0085100 A1*  4/2011  Kim .................. G02F 1/134363
349/41
2013/0127829 A1  5/2013  Hou et al.
(Continued)

FOREIGN PATENT DOCUMENTS

CN   101398581 A   4/2009
CN   102707524 A   10/2012
(Continued)

OTHER PUBLICATIONS

International Search Report dated Jan. 5, 2017.
First CHinese Office Action dated May 31, 2018.

*Primary Examiner* — Md Saiful A Siddiqui
(74) *Attorney, Agent, or Firm* — Dilworth & Baresse, LLP; Michael J. Musella, Esq.

(57) ABSTRACT

An array substrate and a manufacture method thereof, a display panel and a display device are provided, and the array substrate includes a base substrate, and gate lines, first data lines, second data lines, and pixel units arranged in a matrix which are disposed on the base substrate. Each row of the pixel units is driven by one corresponding gate line; in the pixel units, every two rows of the pixel units forms one pixel unit row group that receives a same gate signal during the operation of the array substrate; each column of the pixel units is driven by one corresponding first data line and one corresponding second data line, and the first data lines and the second data lines that are adjacent are at least (Continued)

partially overlapped with each other in a direction perpendicular to a surface of the base substrate.

16 Claims, 5 Drawing Sheets

(51) Int. Cl.
    *G02F 1/1343*     (2006.01)
    *G02F 1/1335*     (2006.01)

(56) References Cited

U.S. PATENT DOCUMENTS

| | | | |
|---|---|---|---|
| 2013/0162616 A1 | 6/2013 | Park et al. | |
| 2014/0226100 A1* | 8/2014 | Kim | G02F 1/134363 |
| | | | 349/43 |
| 2016/0005373 A1* | 1/2016 | Kimura | G09G 3/3688 |
| | | | 345/212 |
| 2016/0062192 A1* | 3/2016 | Yang | G02F 1/134309 |
| | | | 257/71 |
| 2016/0190159 A1 | 6/2016 | Ding et al. | |
| 2016/0247821 A1 | 8/2016 | Li et al. | |

FOREIGN PATENT DOCUMENTS

| | | |
|---|---|---|
| CN | 102411241 A | 4/2013 |
| CN | 103413812 A | 11/2013 |
| CN | 203455564 U | 2/2014 |
| CN | 104049427 A | 9/2014 |
| CN | 104460144 A | 3/2015 |
| CN | 104460163 A | 3/2015 |

\* cited by examiner

ARRAY SUBSTRATE AND MANUFACTURING METHOD THEREOF, DISPLAY PANEL AND DISPLAY DEVICE

The present application claims priority to Chinese patent application No, 201610190726.5, filed on Mar. 29, 2016, the entire disclosure of which is incorporated herein by reference as part of the present application.

TECHNICAL FIELD

Embodiments of the present disclosure relate to an array substrate and a manufacture method thereof, a display panel and a display device.

BACKGROUND

TFT-LCD (Thin Film Transistor-Liquid Crystal Display) has advantages of good quality of image display, low power consumption, and environmental friendliness, and is widely used in display field.

A display panel in TFT-LCD is formed by cell assembling an array substrate and an opposing substrate, and a cavity formed after cell assembling is filled with liquid crystal. The array substrate is provided with data lines and gate lines which are crossing with each other, the data lines and the gate lines are crossed to form pixel units arranged in a matrix.

SUMMARY

At least one embodiment of the present disclosure provides an array substrate, comprising a base substrate, and a plurality of gate lines, a plurality of first data lines, a plurality of second data lines and a plurality of rows and columns of pixel units arranged in a matrix which are disposed on the base substrate. Each row of the pixel units is driven by one corresponding gate line; in the plurality of rows of the pixel units, every two rows of the pixel units forms one pixel unit row group, and the pixel unit row group receives a same gate signal during the operation of the array substrate; each column of the pixel units is driven by one corresponding first data line and one corresponding second data line, the first data lines and the second data lines that are adjacent are insulated from each other, disposed on different layers and connected to different pixel units, and the first data lines and the second data lines that are adjacent are at least partially overlapped with each other in a direction perpendicular to a surface of the base substrate.

For example, in the array substrate provided by an embodiment of the present disclosure, the pixel units in a (2m−1)th row and the pixel units in a (2m)th row form the one pixel unit row group, and the pixel unit row group receives the same gate line signal during the operation of the array substrate, and m is a natural number greater than or equal to 1.

For example, in the array substrate provided by an embodiment of the present disclosure, the array substrate further comprises a plurality of first through holes and a thin film transistor disposed on each of the pixel units; the first data lines are disposed on a same layer as source electrodes and drain electrodes of thin film transistors in one row of the pixel units in each pixel unit row group, the second data lines are electrically connected with thin film transistors in the other row of the pixel units in the pixel unit row group through corresponding first through holes.

For example, in the array substrate provided by an embodiment of the present disclosure, the first holes are at least partially overlapped with the gate lines in a direction perpendicular to the surface of the array substrate.

For example, in the array substrate provided by an embodiment of the present disclosure, the array substrate further comprises a first passivation layer, and the first passivation layer is disposed between the first data lines and the second data lines.

For example, in the array substrate provided by an embodiment of the present disclosure, the first passivation layer is an inorganic insulating layer.

For example, in the array substrate provided by an embodiment of the present disclosure, the array substrate further comprises a shielding electrode layer and a common electrode; the shielding electrode layer is disposed between the first passivation layer and the second data lines, and the shielding electrode layer is disposed on a same layer, formed of a same material and applied with a same voltage as the common electrode.

For example, in the array substrate provided by an embodiment of the present disclosure, the array substrate further comprises a second passivation layer; the second passivation layer is disposed between the shielding electrode layer and the second data lines.

For example, in the array substrate provided by an embodiment of the present disclosure, the second passivation layer is an inorganic insulating layer.

For example, in the array substrate provided by an embodiment of the present disclosure, the array substrate further comprises a planarization layer; the planarization layer is disposed between the shielding electrode layer and the first passivation layer.

For example, in the array substrate provided by an embodiment of the present disclosure, the planarization layer is a resin layer.

For example, in the array substrate provided by an embodiment of the present disclosure, the array substrate further comprises a protection layer and pixel electrodes; the protection layer is disposed on the second data lines, and the protection layer is disposed on a same layer and formed of a same material as the pixel electrodes.

For example, in the array substrate provided by an embodiment of the present disclosure, the protection layer is an indium tin oxide layer.

At least one embodiment of the present disclosure further provides a display panel, comprising the array substrate according to any one of embodiments of the disclosure.

At least one embodiment of the present disclosure further provides a display device, comprising the display panel according to any one of embodiments of the disclosure.

At least one embodiment of the present disclosure further provides a manufacturing method of an array substrate, comprising: forming a plurality of gate lines, a plurality of first data lines, a plurality of second data lines and a plurality of rows and columns of pixel units arranged in a matrix on a base substrate. Each row of the pixel units is driven by one corresponding gate line, in a plurality of rows of the pixel units, every two rows of the pixel units forms one pixel unit row group; each column of the pixel units is driven by one corresponding first data line and one corresponding second data lines, the first data lines and the second data lines that are adjacent are insulated from each other, disposed on different layers and connected to different pixel units, the first data lines and the second data lines that are adjacent are at least partially overlapped with each other in a direction perpendicular to a surface of the base substrate.

For example, the manufacturing method provided by an embodiment of the present disclosure, further comprises forming a first passivation layer between the first data lines and the second data lines.

For example, the manufacturing method provided by an embodiment of the present disclosure, further comprises forming a shielding electrode layer and a common electrode by a same patterning process; the shielding electrode layer is disposed between the first passivation layer and the second data lines.

For example, the manufacturing method provided by an embodiment of the present disclosure, further comprises forming a second passivation layer between the shielding electrode layer and the second data lines.

For example, the manufacturing method provided by an embodiment of the present disclosure, further comprises forming a protection layer and pixel electrodes by a same patterning process; the protection layer is disposed on the second data lines.

BRIEF DESCRIPTION OF THE DRAWINGS

In order to clearly illustrate the technical solution of embodiments of the disclosure, the drawings of the embodiments or related technical description will be briefly described in the following; it is obvious that the drawings in the description are only related to some embodiments of the disclosure and not limited to the disclosure.

DETAILED DESCRIPTION

The technical solutions of the embodiments will be described in a clearly and fully understandable way in connection with the drawings related to the embodiments of the disclosure. With reference to non-limitative embodiments shown in the drawings and described in detail below, the embodiments of the present disclosure and their various features and advantageous details will be described more fully. It should be noted that the features shown in the drawings are not drawn in a real scale. The present disclosure omits the description of the known materials, components, and process techniques, so as not to blur the embodiments of the present disclosure. The provided examples are only intended to understand the implementation of the embodiments of the present disclosure, and so that the skilled in the field can implement the embodiments. Thus, these embodiments should not be interpreted as limitations of the scope of the embodiments of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. In addition, in the embodiments of the present disclosure, the same or the similar reference labels represent the same or the similar components.

An array substrate of a liquid crystal display panel may be driven by progressive scanning, but in a case that a refresh frequency of the driving method is increased, this driving method renders the charging time of a pixel electrode to be not enough, which leads to a poor picture quality and hinders the development of large-size and high-resolution liquid crystal display products. An array substrate of a liquid crystal panel may be driven by double scanning, that is, there are two rows of pixel electrodes in a charged state at any time, and this driving method is capable of providing the charging time two times as long as that for the progressive scanning mode for each pixel electrode and ensuring a good picture quality, especially suitable for a large size and high resolution liquid crystal display product. Double scanning needs to provide two data lines corresponding to each column of pixel units, and the two data lines need to be spaced at a certain distance. A black matrix may be disposed on an opposing substrate (such as a color filter substrate) close to a light exit side of a liquid crystal display panel corresponding to the data lines on an array substrate. Therefore, in a case that the two data lines are disposed on the same layer, the width of the black matrix is correspondingly increased in the width direction of the data lines, which resulting in a decrease of the aperture ratio of the liquid crystal display panel.

For example, in a case that the refresh frequency is 60 Hz, the number of rows of the pixel units is 1024, and the driver adopts the progressive scanning mode, the charging time of each row of the pixel electrodes is 1/(1024×60) second, which is about 16.3 μs, that is, switching from one gray scale to another gray scale requires about 16.3 μs (this includes a total required time for charging voltage to reach a required value and liquid crystal deflection). But in the double scanning mode, charging time of each row of the pixel electrodes is 1/(512×60) second, which is about 32.6 μs, that is, double scanning provides the charging time two times as long as that for the progressive scanning mode for a pixel electrode in each row of the pixel units.

Figure 1:
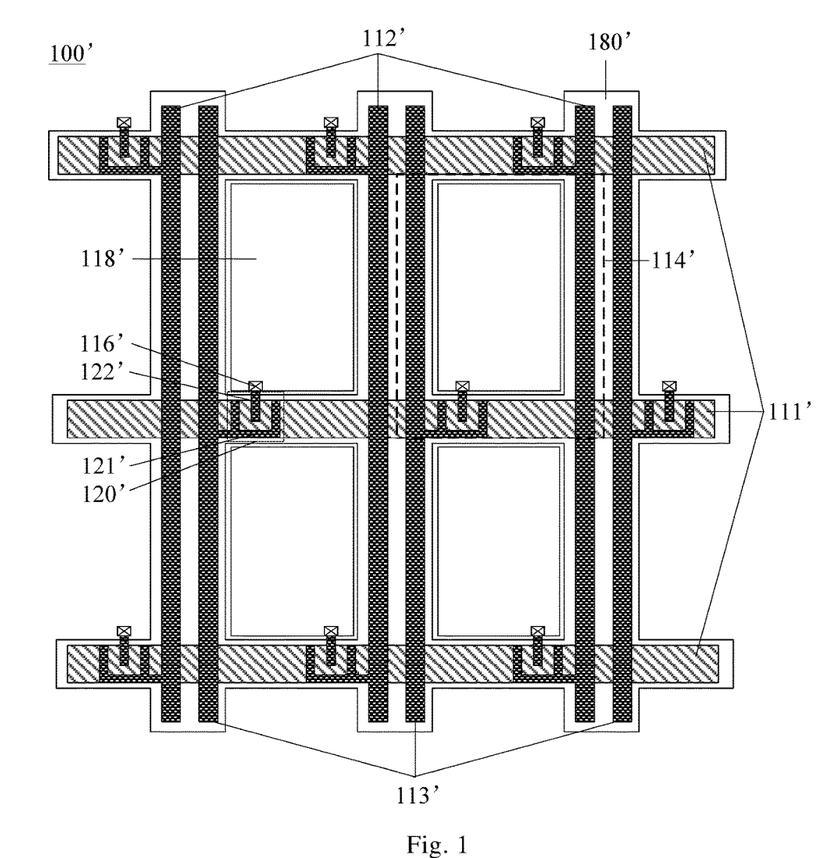
FIG. 1 is a top view of an array substrate.

For example, FIG. 1 is a top view of an array substrate 100'. The array substrate 100' comprises a plurality of first data lines 112', a plurality of second data lines 113', a plurality of gate lines 111', and a plurality of pixel units 114'. Each of the pixel units 114' is provided with a thin film transistor 120' and a pixel electrode 118', and the first data lines 112' are disposed on the same layer as the second data lines 113', and the first data lines 112' and the second data lines 113' are electrically connected with source electrodes 121' of the thin film transistors 120' in different rows of the pixel units respectively. A drain electrode 122' of the thin film transistor 120' is electrically connected with a pixel unit 118' through a second through hole 116'. Every two rows of the pixel units 114' receives the same gate signal during the operation of the array substrate 100', for example, two gate lines which are configured to drive the first row and the second row of the pixel units receive the same gate signal during operation, thus, the first row and second row of the pixel units are synchronously turned on and off. A black matrix 180' covers the first data lines 112', the second data lines 113' and the gate lines 111', and the black matrix 180' may be disposed on an opposing substrate opposite to the array substrate in a liquid crystal panel, or may be disposed on the array substrate directly.

The array substrate 100' as illustrated in FIG. 1 is capable of implementing double scanning, and providing charging time two times as long as that of the progressive scanning mode to each pixel electrode. But compared with the progressive scanning mode, the occupied area of the black matrix 180' is increased, which leads to the decrease of an aperture ratio of the liquid crystal display panel adopting the array substrate, thereby increasing energy consumption.

At least one embodiment of the present disclosure provides an array substrate, the array substrate comprises a base substrate, and a plurality of gate lines, a plurality of first data lines, a plurality of second data lines and a plurality of rows and columns of pixel units arranged in a matrix which are disposed on the base substrate; each row of the pixel units is driven by one corresponding gate line; in the plurality of rows of the pixel units, every two rows of the pixel units forms one pixel unit row group, and the pixel unit row group receives the same gate signal during the operation of the array substrate; each column of the pixel units is driven by one corresponding first data line and one corresponding second data line, the first data lines and the second data lines that are adjacent are insulated from each other, disposed on different layers and connected to different pixel units, the first data lines and the second data lines that are adjacent are at least partially overlapped with each other in a direction perpendicular to a surface of the base substrate.

The array substrate provided by at least one embodiment of the present disclosure reduces the occupied area of two data lines, thereby reducing the area correspondingly needed to be covered by a black matrix, and raising the aperture ratio of the liquid crystal display panel adopting the array substrate, reducing power consumption of the liquid crystal display panel.

Figure 2:
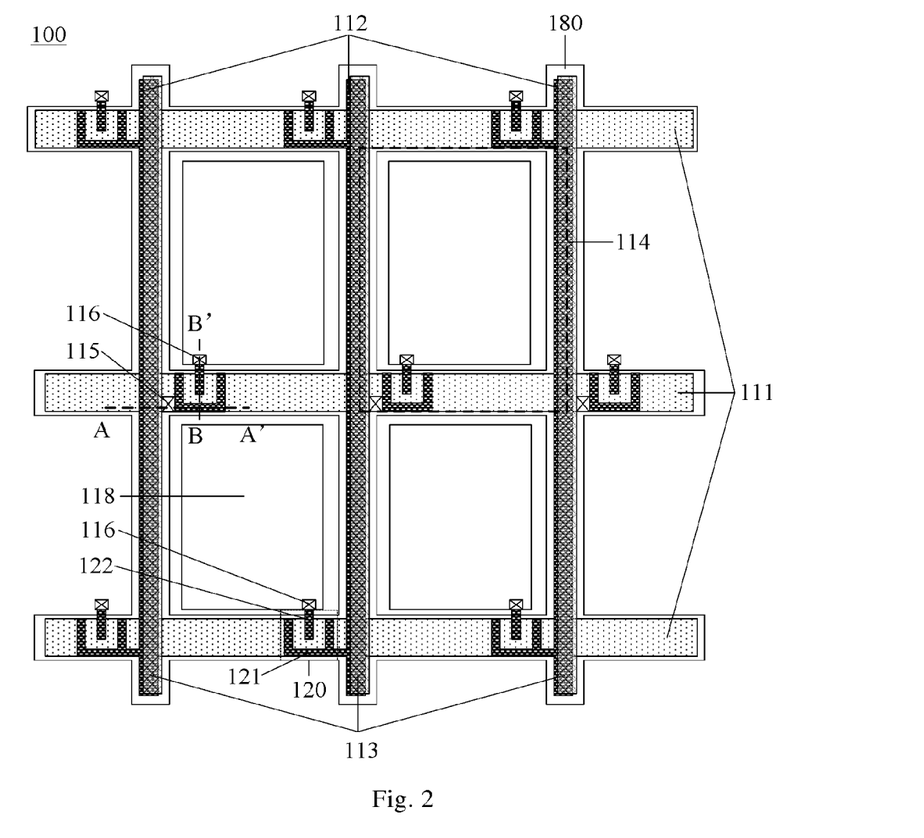
FIG. 2 is a top view of an array substrate provided by an embodiment of the present disclosure.
Figure 3:
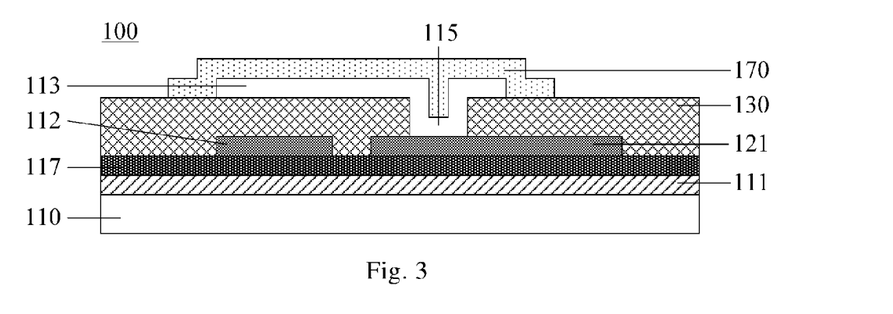
FIG. 3 is a sectional view of an example of an array substrate along the AA' line in FIG. 2 provided by an embodiment of the present disclosure.
Figure 4:
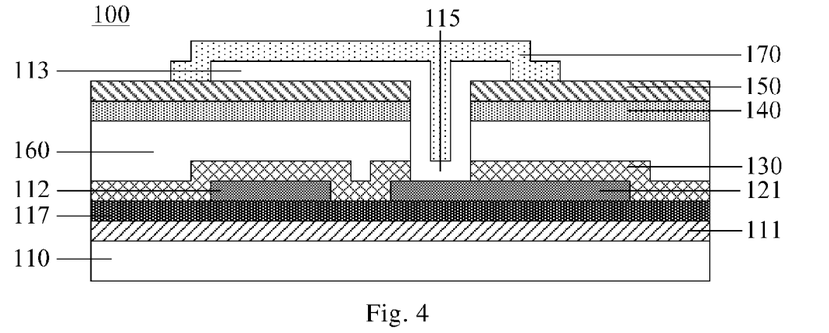
FIG. 4 is a sectional view of another example of an array substrate long the AA' line in FIG. 2 provided by an embodiment of the present disclosure.

FIG. 2 is a top view of an array substrate provided by an embodiment of the present disclosure; FIG. 3 is a sectional view of an example of an array substrate along the AA' line in FIG. 2 provided by an embodiment of the present disclosure; FIG. 4 is a sectional view of another example of an array substrate long the AA' line in FIG. 2 provided by an embodiment of the present disclosure; FIG. 5I is a sectional view along the BB' line in FIG. 2 corresponding to an array substrate in FIG. 4 provided by an embodiment of the present disclosure.

As illustrated in FIG. 2, FIG. 3, FIG. 4 and FIG. 5I, an embodiment of the present disclosure provides an array substrate 100, the array substrate 100 comprises a base substrate 110, and a plurality of gate lines 111, a plurality of first data lines 112, a plurality of second data lines 113 and a plurality of rows and columns of pixel units 114 arranged in a matrix which are disposed on the base substrate 110, and each row of the pixel units 114 is driven by one corresponding gate line 111. In the plurality of rows of the pixel units 114, every two rows of the pixel units 114 forms one pixel unit row group, and the pixel unit row group receives the same gate signal during the operation of the array substrate 100, for example, two gate lines configured to form one pixel unit row group are connected to the same one gate driver. Each column of the pixel units 114 is driven by one corresponding first data line 112 and one corresponding second data line 113, the first data line 112 and the second data line 113 that are adjacent to each other are insulated from each other, disposed on different layers and connected to different pixel units 114, the first data line 112 and the second data line 113 that are adjacent are at least partially overlapped with each other in the direction perpendicular to a surface of the base substrate 110. For example, the first data line 112 and the second data line 113 that are adjacent are completely overlapped with each other in the direction perpendicular to the surface of the base substrate 110. For example, the projection of the second data line 113 in an upper layer relative to the base substrate 110 completely falls into the projection of the first data line 112 in a lower layer relative to the base substrate 110, and therefore, the width of the second data line 113 is less than or equal to the width of the first data line 112.

As illustrated in FIG. 2, the first data line 112 and the second data line 113 adjacent to each other between two columns of the pixel units are configured to drive the two columns of the pixel units located on both sides of the first data line 112 and the second data line 113, the first data line 112 as illustrated in the figure is configured to drive the pixel units in the first, third, fifth row and so on in the left column, and the second data line 113 as illustrated in the figure is configured to drive the pixel units in the second, fourth, sixth row and so on in the right column. However, an embodiment of the present disclosure is not limited to this, the first data line 112 and the second data line 113 adjacent to each other between two columns of the pixel units are configured to drive one column of the pixel units located on the same side of them, for example, the first data line 112 is configured to drive the pixel units in the first, third, fifth row and so on in one column, and the second data line 113 is configured to drive the pixel units in the second, fourth, sixth row and so on in the same column.

For example, as illustrated in FIG. 2, compared with the black matrix 180' in FIG. 1, because the first data line 112 and the second data line 113 that are adjacent to each other between two columns of the pixel units are overlapping disposed, the totally occupied substrate area of the two lines is decreased relatively to the case that the two lines are juxtaposed with each other, thus, the area covered by the black matrix 180 in FIG. 2 is reduced, and the aperture ratio of the liquid crystal display panel adopting the array substrate is increased.

For example, in the array substrate 100 provided by an embodiment of the present disclosure, the pixel units in the (2m−1)th row and the pixel units in the (2m)th row form one pixel unit row group, and the pixel unit row group receives the same gate signal during the operation of the array substrate 100, and here m is a natural number greater than or equal to 1.

In another embodiment of the present disclosure, two rows of the pixel units configured to form one pixel cell row group are not adjacent. For example, the pixel units in the (4m−3)th row and the pixel units in the (4m−1) row form one pixel unit row group, and the pixel units in the (4m−2)th row and the pixel units in the (4m)th row form another pixel unit row group, and here m is a natural number greater than or equal to 1; or, in a case that the entire array substrate comprises 2n row pixel units, the pixel units in the (m)th row and the pixel units in the (n+m)th row form one pixel unit row group, and here m and n are natural numbers greater than or equal to 1, and m<n.

For example, the array substrate 100 provided by an embodiment of the present disclosure further comprises a plurality of first through holes 115 and a thin film transistor 120 disposed in each of the pixel units 140, and the first data lines are disposed on the same layer as the source electrodes and the drain electrodes of the thin film transistors in one row of the pixel units in each pixel unit row group, the second data lines are electrically connected with the thin film transistors in the other row of the pixel units in the pixel unit row group through corresponding first through holes. For example, in the above mentioned case that the pixel units in the (2m−1)th row and the pixel units in the (2m)th row form one pixel unit row group, the first data lines 112 are disposed on the same layer as the source electrodes 121 and the drain electrodes 122 of the thin film transistors 120 in the pixel units in the (2m−1)th row, and electrically connected with the source electrodes 121 (or the drain electrodes 122), and the second data lines 113 are electrically connected with the source electrodes 121 (or the drain electrodes 122) of the thin film transistors 120 in the pixel units in the (2m)th row through the first through holes 115; or the first data lines 112 are disposed on the same layer as the source electrodes 121 and the drain electrodes 122 of the thin film transistors 120 in the pixel units in the (2m)th row, and electrically connected with the source electrodes 121 (or the drain electrodes 122), and the second data lines 113 are electrically connected with the source electrodes 121 (or the drain electrodes 122) of the thin film transistors 120 in the pixel units in the (2m−1)th row through the first through holes 115.

For example, as illustrated in FIG. 2, the drain electrode 122 of the thin film transistor 120 is electrically connected with the pixel electrode 118 through a second through hole 116.

For example, an operation principle of double scanning in the array substrate 100 as illustrated in FIG. 2 may be described in the following. The following description is made by taking the case that the pixel units in (2m−1)th row and the pixel units in (2m)th row to form one pixel unit row group (m is a natural number greater than or equal to 1) as an example, but this principle is also applied to the configuration of pixel unit row group in other embodiments.

At the first preset time, the gate line for the pixel units in the first row receives the same gate turn-on signal as the gate line for the pixel units in the second row, the pixel units in the first row and the second row are turned on simultaneously; meanwhile, data signals are transmitted to the pixel units in the first row or the second row through the first data lines 112, and data signals are transmitted to the pixel units in the second row or the first row through the second data lines 113 correspondingly; after a cycle, the gate line for the pixel units in the first row receives the same gate turn-off signal as the gate line for the pixel units in the second row, the pixel units in the first row and the second row are turned off simultaneously, so as to driven the pixel units in the first row and the second row simultaneously.

At the second preset time, the gate line for the pixel units in the third row receives the same gate turn-on signal as the gate line for the pixel units in the fourth row, the pixel units in the third row and the fourth row are turned on simultaneously; meanwhile, data signals are transmitted to the pixel units in the third row or the fourth row through the first data lines 112, and data signals are transmitted to the pixel units in the fourth row or the third row the second data lines 113 correspondingly; after a cycle, the gate line for the pixel units in the third row receives the same gate turn-off signal as the gate line of the pixel units in the fourth row, the pixel units in the third row and the fourth row are turned off simultaneously, so as to driven the pixel units in the third row and the fourth row simultaneously.

The operation as mentioned above is conducted sequentially with respect to the following pixel unit row groups until the pixel units in the entire array substrate are charged, thereby scan of one frame is completed.

For example, the pixel units in the (2m−1)th row and the pixel units in the (2m) row may be driven by the same gate driver or the same output channel of a gate driver so as to receive the same gate signal. Therefore, the reduction in the number of output channels of the gate drive or gate drives simplifies circuit design and saves the cost of the gate drives.

For example, as illustrated in FIG. 2, in the array substrate 100 provided by an embodiment of the present disclosure, the first through holes 115 are at least partially overlapped with the gate lines 111 in a direction perpendicular to the surface of the array substrate 100. The first through holes 115 overlap the gate lines 111 so that the first through holes 115 do not occupy an area of the pixel electrodes 118, so as to increase the aperture ratio.

For example, the shape of the thin film transistor 120 is not limited to the U type channel thin film transistor as illustrated in FIG. 2, or may be a linear channel thin film transistor, which is not limited herein.

For example, FIG. 3 is a sectional view of an example of an array substrate along the AA' line in FIG. 2 provided by an embodiment of the present disclosure. As illustrated in FIG. 3, the array substrate 100 provided by an embodiment of the present disclosure further comprises a first passivation layer 130, and the first passivation layer 130 is disposed between the first data lines 112 and the second data lines 113. The first passivation layer 130 makes the adjacent first data lines 112 and the second data lines 113 to be insulated from each other, and reduces signal crosstalk between the first data lines 112 and the second data lines 113.

For example, in the array substrate array 100 provided by an embodiment of the present disclosure, the first passivation layer 130 is an inorganic insulating layer.

For example, FIG. 4 is a sectional view of another example of an array substrate long the AA' line in FIG. 2 provided by an embodiment of the present disclosure. As illustrated in FIG. 4, the array substrate array 100 provided by an embodiment of the present disclosure further comprises a shielding electrode layer 140 and a common electrode, the shielding electrode layer 140 is disposed between the first passivation layer 130 and the second data lines 113, the shielding electrode layer 140 is disposed on the same layer, formed of the same material and applied with the same voltage as the common electrode. The shielding electrode layer 140 can reduce the signal crosstalk between the first data lines 112 and the second data lines 113. For example, the shielding electrode layer 140 may be formed of indium oxide tin (ITO).

For example, the array substrate 100 provided by an embodiment of the present disclosure further comprises a second passivation layer 150. The second passivation layer 150 is disposed between the shielding electrode layer 140 and the second data lines 113. The second passivation layer 150 makes the shielding electrode layer 140 and the second data lines 113 to be insulated from each other, and reduces the signal crosstalk between the first data lines 112 and the second data lines 113.

For example, in the array substrate array 100 provided by an embodiment of the present disclosure, the second passivation layer 150 is an inorganic insulating layer.

The shielding electrode layer 140 may be formed directly on the first passivation layer 130; or, for example, the array substrate 100 provided by an embodiment of the present disclosure further comprises a planarization layer 160. The planarization layer 160 is disposed between the shielding electrode layer 140 and the first passivation layer 130. The planarization layer 160 is capable of playing a planarization role to facilitate the homogeneous formation of the subsequent layers and simultaneously reduce the signal crosstalk between the first data lines 112 and the second data lines 113.

For example, in the array substrate array 100 provided by an embodiment of the present disclosure, the planarization layer 160 is, for example, a resin layer.

For example, the array substrate 100 provided by an embodiment of the present disclosure further comprises a protection layer 170 and pixel electrodes. The protection layer 170 is disposed on the second data lines 113, for example, the protection layer 170 covers the second data lines 113. The protection layer 170 is disposed on the same layer and formed of the same material as the pixel electrodes, that is, the protection layer 170 may be formed without increasing a process. The protection layer 170 is capable of protecting the second data lines 113 and preventing the second data lines 113 from being oxidized.

For example, in the array substrate array 100 provided by an embodiment of the present disclosure, the protection layer 170 is, for example, an indium tin oxide (ITO) layer.

At least one embodiment of the present disclosure provides a manufacturing method of an array substrate, which comprises forming a plurality of gate lines, a plurality of first data lines, a plurality of second data lines and a plurality of rows and columns of pixel units arranged in a matrix on a base substrate; each row of the pixel units is driven by one corresponding gate line; in the plurality of rows of the pixel units, every two rows of the pixel units forms one pixel unit row group; each column of the pixel units is driven by one corresponding first data lines and one corresponding second data line, the first data lines and the second data lines that are adjacent are insulated from each other, disposed on different layers and connected to different pixel units, the first data lines and the second data lines that are adjacent are at least partially overlapped with each other in a direction perpendicular to a surface of the base substrate.

For example, the manufacturing method of an array substrate provided by an embodiment of the present disclosure further comprises forming a first passivation layer between the first data lines and the second data lines.

For example, the manufacturing method of an array substrate provided by an embodiment of the present disclosure further comprises forming a shielding electrode layer between the first passivation layer and the second data lines.

For example, the manufacturing method of an array substrate provided by an embodiment of the present disclosure further comprises forming a second passivation layer between the shielding electrode layer and the second data lines.

For example, the manufacturing method of an array substrate provided by an embodiment of the present disclosure further comprises forming a protection layer on the second data lines.

For example, FIG. 5A to FIG. 5I are sectional views along the BB' line in FIG. 2 corresponding to a manufacturing method of an array substrate provided by an embodiment of the present disclosure, which is used for illustration, the embodiments of the present disclosure are not limited to specific structures and procedures illustrated.

For example, an embodiment of the present disclosure further provides an example of the manufacturing method of an array substrate as illustrated in FIG. 5A to FIG. 5I, the following steps are included.

Figure 5A:
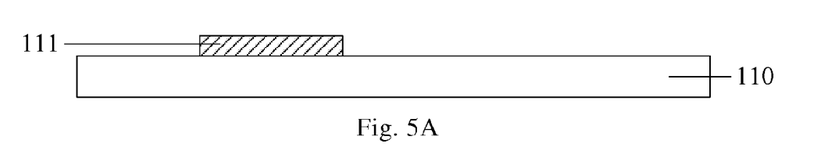
FIG. 5A-FIG. 5I are sectional views along the BB' line in FIG. 2 corresponding to a manufacturing method of an array substrate provided by an embodiment of the present disclosure.

Step 1: as illustrated in FIG. 5A, forming a first metal layer on the base substrate 110, and forming the gate lines 111 by the first patterning process. For example, the first metal layer is formed by a magnetron sputtering process, and the materials for manufacturing the first metal layer comprise aluminum, molybdenum, aluminum nickel alloy, chromium, copper, or any combination thereof; or along with the formation of the gate lines 111, a common electrode line is also formed.

Figure 5B:
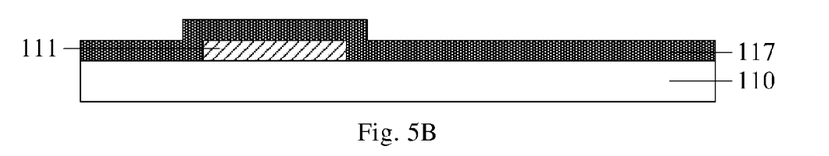

Step 2: as illustrated in FIG. 5B, forming a gate insulating layer 117 on the gate lines 111. For example, the gate insulating layer 117 is formed by a chemical vapor deposition process, and the materials for manufacturing the gate insulation 117 comprise silicon nitride, silicon oxide, oxynitride or any combination thereof.

Figure 5C:
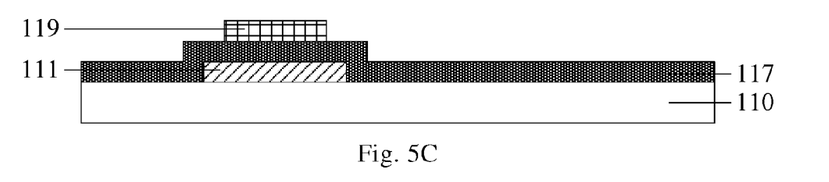

Step 3: as illustrated in FIG. 5C, forming an active layer 119 on the gate insulating layer 117 by the second patterning process. For example, the active layer 119 is formed by a chemical vapor deposition process, and the materials for manufacturing the active layer 119 comprise amorphous silicon, polysilicon, oxide semiconductor, or the like.

Figure 5D:
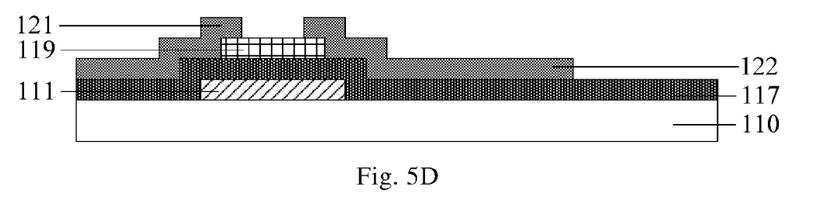

Step 4: as illustrated in FIG. 5D, forming a second metal layer on the active layer 119, forming source electrodes 121, drain electrodes 122 and first data lines 112 (the first data lines are illustrated in FIG. 4) by the third patterning process. For example, the second metal layer is formed by magnetron sputtering, the materials for manufacturing the second metal layer comprise aluminum, molybdenum, aluminum nickel alloy, chromium, copper, or any combination thereof.

Figure 5E:
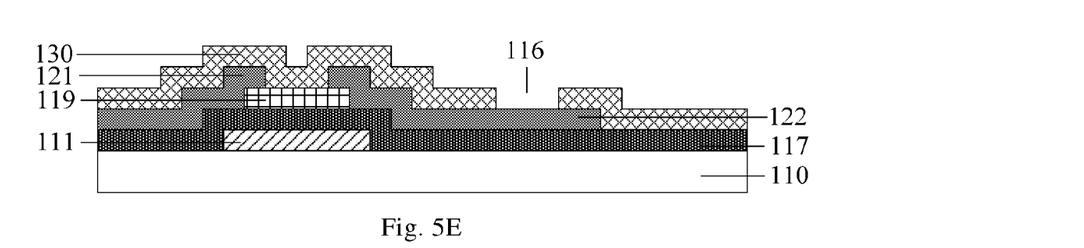

Step 5: as illustrated in FIG. 5E, forming a first passivation layer 130 on the source electrodes 121 and the drain electrodes 122, forming first through holes 115 (the first through holes 115 for the source electrodes 121 as illustrated in FIG. 4) corresponding to the source electrodes 121 and second through holes 116 corresponding to the drain electrodes 122 by the fourth patterning process; for example, the first passivation layer 130 is formed by a chemical vapor deposition process, and the materials for manufacturing the first passivation layer 130 comprise oxides or nitrides.

Figure 5F:
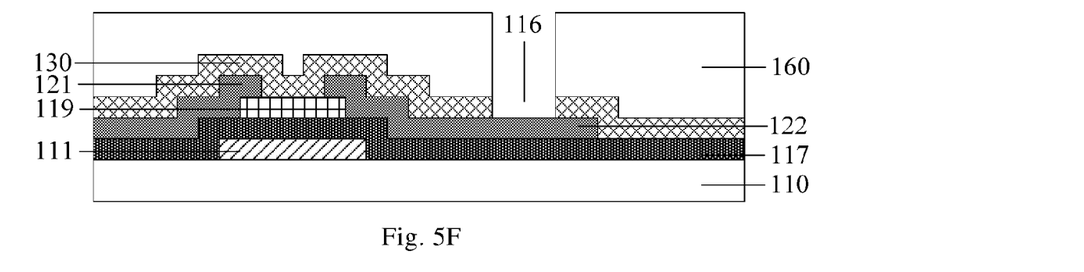

Step 6: as illustrated in FIG. 5F, forming a planarization layer 160 on the first passivation layer 130 by the fifth patterning process. For example, the planarization layer 160 is formed of a chemical vapor deposition process, and the material for manufacturing the planarization layer 160 includes, for example a resin.

Figure 5G:
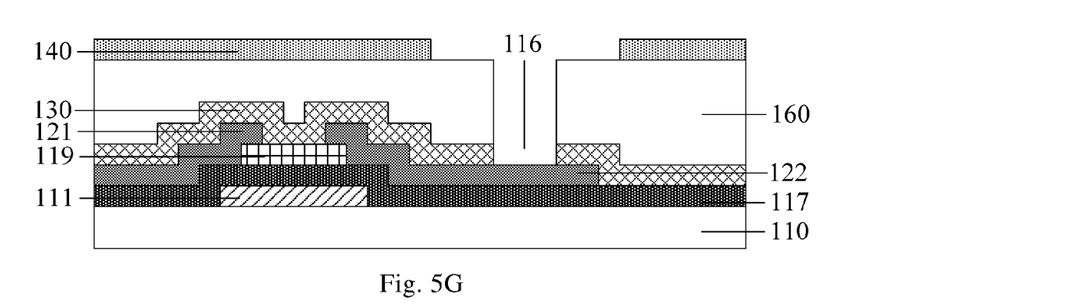

Step 7: as illustrated in FIG. 5G, forming a shielding electrode layer 140 on the planarization layer 160 by the sixth patterning process. For example, the materials for manufacturing the shielding electrode layer 140 comprise indium tin oxide (ITO) or indium zinc oxide (IZO); or, along with the formation of the shielding electrode layer 140, a common electrode(s) is further formed in the pixel units, the common electrode is, for example formed of the same material as the shielding electrode layer, and the common electrode(s) can be electrically connected with a common electrode wire through a through hole formed in addition.

Figure 5H:
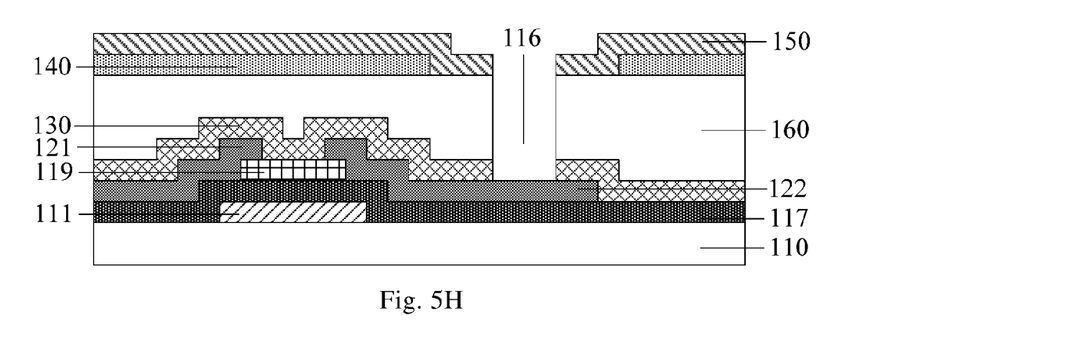
Figure 5I:
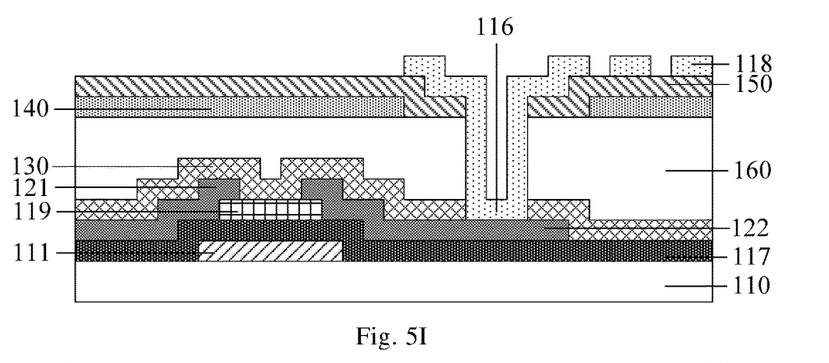

Step 8: as illustrated in FIG. 5H, forming a second passivation layer 150 on the shielding electrode layer 140 by the seventh patterning process. For example, the second passivation layer 150 is formed by a chemical vapor deposition process, and the materials for manufacturing the second passivation layer 150 comprise oxides or nitrides.

Step 9: forming a third metal layer on the second passivation layer 150, forming second data lines 113 (the second data lines 113 are illustrated in FIG. 4) by the eighth patterning process. For example, the third metal layer is formed by a magnetron sputtering process, and the materials for manufacturing the third metal layer comprise aluminum, molybdenum, aluminum nickel alloy, chromium, copper, or any combination thereof.

Step 10: as illustrated in FIG. 5I, forming pixel electrodes 118 in the pixel units and a protection layer 170 (the protection layer 170 is illustrated in FIG. 4) on the second data lines 113 by the ninth patterning process. For example, the pixel electrodes 118 and the protection layer 170 are formed of the same material, such as indium tin oxide (ITO).

For example, each patterning process comprises exposure, development, etching, stripping and other processes.

At least one embodiment of the present disclosure further provides a display panel 10, which comprises the array substrate as mentioned in any embodiment of the present disclosure.

Figure 6:
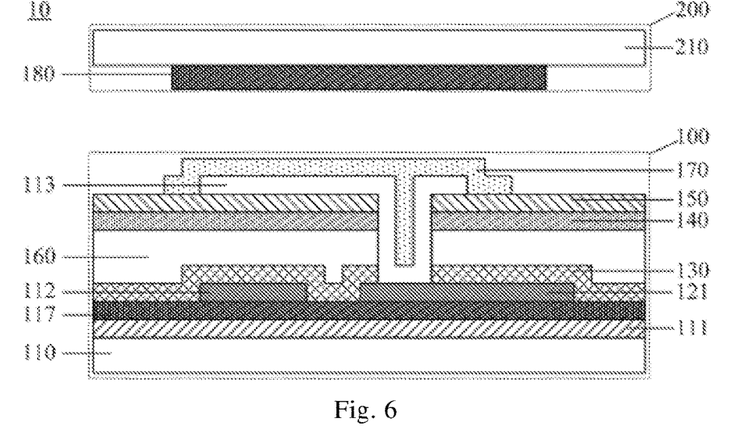
FIG. 6 is a sectional view of a display panel provided by an embodiment of the present disclosure.

For example, as illustrated in FIG. 6, the display panel 10 further comprises an opposing substrate 200, the display panel 10 is formed by cell assembling the array substrate 100 and the opposing substrate 200, and the cavity formed after cell assembling is filled with liquid crystal. The opposing substrate 200 is, for example, a color filter substrate, which comprises an opposing base substrate 210, a black matrix 180, and color filter units (not illustrated in FIG. 6), the width of the black matrix 180 on the color filter substrate is greater than or equal to the totally width of the first data lines and the second data lines on the array substrate. The embodiment of the display panel as illustrated in FIG. 6 is based on the embodiment of the array substrate illustrated in FIG. 4, however, the present disclosure is not limited to this, for example, the display panel may be fabricated based on an embodiment of the array substrate as illustrated in FIG. 3.

At least one embodiment of the present disclosure further provides a display device, which comprises the display panel as mentioned in any embodiment of the present disclosure.

For example, the display device provided by an embodiment of the present disclosure may be: a mobile phone, a tablet computer, a television, a monitor, a laptop, a digital photo frame, a navigator, and any other display products or components.

The array substrate, the display panel and the display device provided by at least one embodiment of the present disclosure reduce the occupied area of two data lines, reducing the area correspondingly needed to be covered by the black matrix and raising the aperture ratio of the liquid crystal display panel.

Although the present disclosure has be described in detail above through the general description and specific embodiments, but on the basis of the embodiments of the present disclosure, some modifications or improvements can be made, which is obvious to the skilled in the field. Therefore, these modifications or improvements made without departing from the spirit of the present disclosure are within the scope of the present disclosure.

What is claimed is:

1. An array substrate, comprising a base substrate, and a plurality of gate lines, a plurality of first data lines, a plurality of second data lines, a plurality of rows and columns of pixel units arranged in a matrix which are disposed on the base substrate, a first passivation layer disposed between the first data lines and the second data lines, a shielding electrode layer and a common electrode, wherein,
   each row of the pixel units is driven by one corresponding gate line, in the plurality of rows of the pixel units, every two rows of the pixel units forms one pixel unit row group, and the pixel unit row group receives a same gate signal during the operation of the array substrate;
   each column of the pixel units is driven by one corresponding first data line and one corresponding second data line, the first data lines and the second data lines that are adjacent are insulated from each other, disposed on different layers and connected to different pixel units, and the first data lines and the second data lines that are adjacent are at least partially overlapped with each other in a direction perpendicular to a surface of the base substrate;
   the shielding electrode layer is disposed between the first passivation layer and the second data lines, and the shielding electrode layer is disposed on a same layer, formed of a same material and applied with a same voltage as the common electrode.

2. The array substrate according to claim 1, wherein, the pixel units in a (2m−1)th row and the pixel units in a (2m)th row form the one pixel unit row group, and the pixel unit row group receives the same gate signal during the operation of the array substrate, and m is a natural number greater than or equal to 1.

3. The array substrate according to claim 1, further comprising a plurality of first through holes and a thin film transistor disposed in each of the pixel units, wherein,
   the first data lines are disposed on a same layer as source electrodes and drain electrodes of thin film transistors in one row of the pixel units in each pixel unit row group, the second data lines are electrically connected with thin film transistors in the other row of the pixel units in the pixel unit row group through corresponding first through holes.

4. The array substrate according to claim 3, wherein, the first through holes are at least partially overlapped with the gate lines in a direction perpendicular to the surface of the array substrate.

5. The array substrate according to claim 1, wherein the first passivation layer is an inorganic insulating layer.

6. The array substrate according to claim 1, further comprising a second passivation layer, wherein the second passivation layer is disposed between the shielding electrode layer and the second data lines.

7. The array substrate according to claim 6, wherein the second passivation layer is an inorganic insulating layer.

8. The array substrate according to claim 6, further comprising a planarization layer, wherein the planarization layer is disposed between the shielding electrode layer and the first passivation layer.

9. The array substrate according to claim 8, wherein the planarization layer is a resin layer.

10. The array substrate according to claim 8, further comprising a protection layer and pixel electrodes,
    wherein the protection layer is disposed on the second data lines, and the protection layer is disposed on a same layer and formed of a same material as the pixel electrodes.

11. The array substrate according to claim 10, wherein the protection layer is an indium tin oxide layer.

12. A display panel comprising the array substrate according to claim 1.

13. A display device comprising the display panel according to claim 12.

14. A manufacturing method of an array substrate, comprising:
    forming a plurality of gate lines, a plurality of first data lines, a plurality of second data lines and a plurality of rows and columns of pixel units arranged in a matrix on a base substrate,
    wherein each row of the pixel units is driven by one corresponding gate line, and in the plurality of rows of the pixel units, every two rows of the pixel units forms one pixel unit row group;

each column of the pixel units is driven by one corresponding first data line and one corresponding second data line, the first data lines and the second data lines that are adjacent are insulated from each other, disposed on different layers and connected to different pixel units, the first data lines and the second data lines that are adjacent are at least partially overlapped with each other in a direction perpendicular to a surface of the base substrate, the manufacturing method further comprises forming a first passivation layer between the first data lines and the second data lines; and forming a shielding electrode layer and a common electrode by a same patterning process, wherein the shielding electrode layer is disposed between the first passivation layer and the second data lines.

15. The manufacturing method of an array substrate according to claim 14, further comprising:

forming a second passivation layer between the shielding electrode layer and the second data lines.

16. The manufacturing method of an array substrate according to claim 15, further comprising:

forming a protection layer and a pixel electrode by a same patterning process, wherein the protection layer is disposed on the second data lines.

* * * * *